M. A. McCOY.
CORRUGATED IRON FASTENER.
APPLICATION FILED AUG. 8, 1913.
1,133,164.
Patented Mar. 23, 1915.
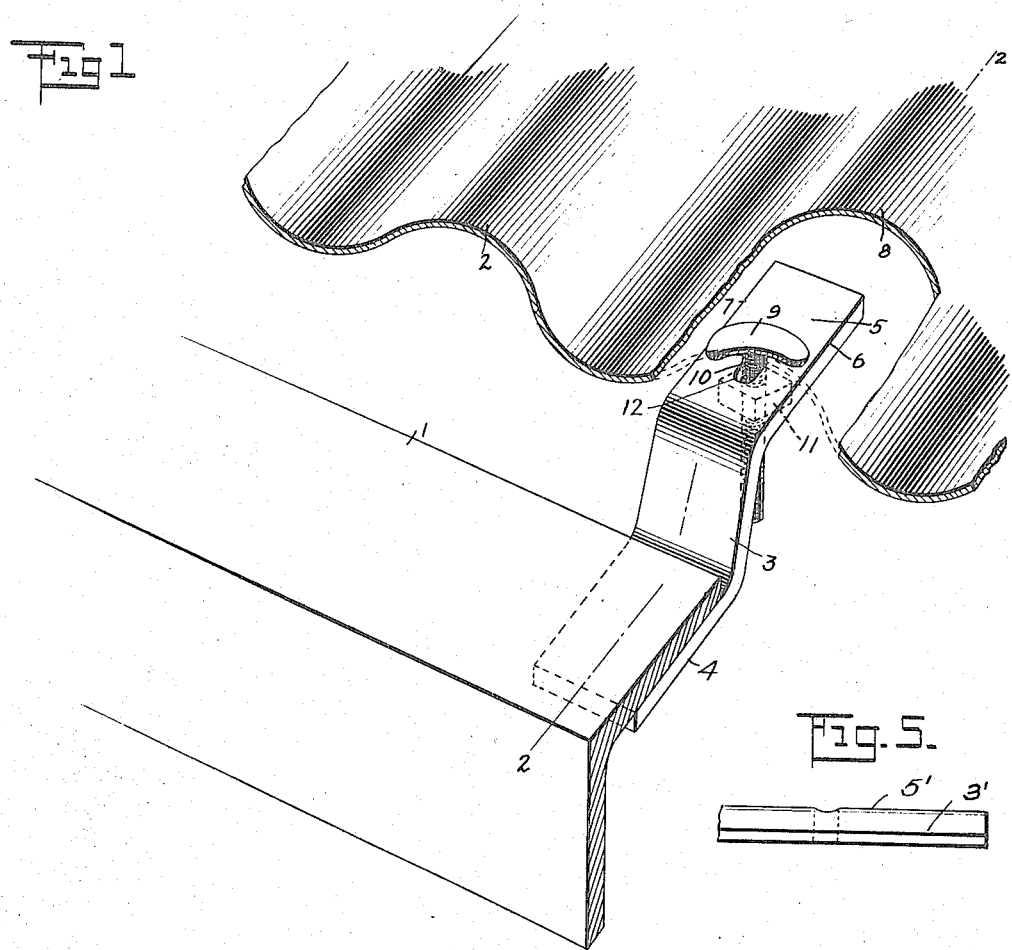
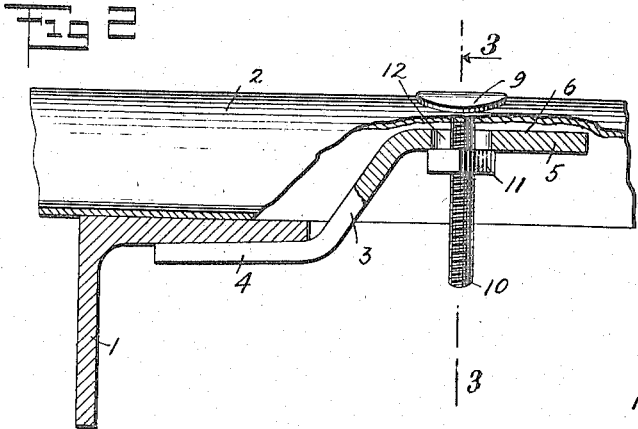
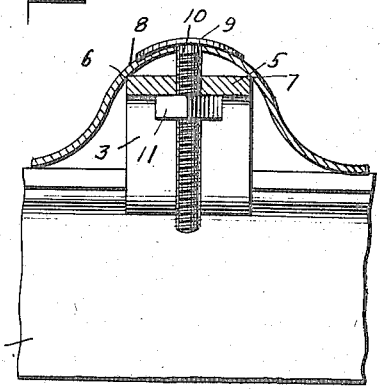
WITNESSES
C. J. Hachenburg
A. L. Kitchin
INVENTOR
Millard A. McCoy
BY Munn & Co
ATTORNEYS

UNITED STATES PATENT OFFICE.

MILLARD A. McCOY, OF PERTH AMBOY, NEW JERSEY.

CORRUGATED-IRON FASTENER.

1,133,164.

Specification of Letters Patent.

Patented Mar. 23, 1915.

Application filed August 8, 1913. Serial No. 783,720.

*To all whom it may concern:*

Be it known that I, MILLARD A. McCOY, a citizen of the United States, and a resident of Perth Amboy, in the county of Middlesex and State of New Jersey, have invented a new and Improved Corrugated-Iron Fastener, of which the following is a full, clear, and exact description.

This invention relates to improvements in fastening devices for corrugated sheet metal, and has for an object to provide an improved structure which may be quickly applied and removed.

Another object of the invention is to provide a simple, strong fastening device in which a minimum number of parts are used without sacrificing any of the strength or retaining ability of the device.

In carrying out the object of the invention a substantially Z-shaped bar is provided, one end of which is designed to be placed against the supporting angle bar or other support and the opposite end is adapted to engage one of the corrugations of a sheet of corrugated metal. A bolt is then passed through the corrugation and through the end of the Z-shaped bar, after which a nut is screwed in place. The bolt is preferably formed with an arc-shaped head so as to properly fit the curve of the corrugation and to prevent a turning of the bolt when the nut is tightened.

In the accompanying drawings—Figure 1 is a perspective view of an embodiment of the invention, the same being shown connected with part of a roof; Fig. 2 is a section through Fig. 1 approximately on line 2—2; Fig. 3 is a section through Fig. 2 on line 3—3; Fig. 4 is a transverse section through a slightly modified form of the clamping bar. Fig. 5 is a side view of the structure shown in Fig. 4.

Referring to the accompanying drawings by numeral 1 indicates an angle iron support and 2 a piece of sheet metal designed to be supported by support 1 in the usual manner in which a sheet metal roof is supported. Engaging the angle iron 1 is a fastening or clamping bar 3 formed substantially Z-shaped so that end 4 may press against angle iron 1 and end 5 may engage one of the corrugations of the sheet metal covering 2.

As clearly shown in Fig. 3 the end 5 is arranged so that the edges 6 and 7 pinch the corrugation 8 while head 9 of bolt 10 clamps tightly against corrugation 8. Bolt 10 is designed to pass through corrugation 8 and also through end 5. A suitable nut 11 is provided for clamping end 5 in position. In clamping end 5 in position end 4 is also pressed against angle iron 1 so that the sheet metal 2 is firmly clamped or secured to the angle iron 1. By using the bolt 10 the bar 3 may be quickly applied or if desired removed. The arrangement of the head 9 so as to conform to or fit the corrugation 8 provides means by which the bolt will not turn when tightening nut 11.

In forming the clamping tool 3 so as to accommodate bolt 10 an aperture 12 is provided, which preferably extends lengthwise of the bolt, as shown in Figs. 1 and 2, though if desired it may extend transversely or in any other desired direction. This is very desirable as it allows the bar 3 to be applied quickly in close spaces or corners, and in addition allows a certain amount of adjustment adapted to various spaces.

Fig. 4 discloses a sectional view through a slightly modified form of bar 3'. This form of bar is formed arc-shaped at end 5' so as to fit into the corrugated metal 2 and thus allow the nut 11 to clamp more firmly against the sheet metal without bending the same.

In the construction of a roof any desired number of the bars 3 may be used, and it will be evident that these bars could be adapted to not only the angle iron 1 but to any form of supporting bar. By reason of the fact that the bars 3 clamp the supporting angle iron 1, vibration, expansion and contraction are permitted without damage to any of the material and yet the roof is held properly in place.

Having thus described my invention, what I claim as new and desire to secure by Letters Patent is—

1. In a fastener of the class described, the combination with a supporting bar and a sheet metal covering supported by said bar, of a retaining and clamping bar formed substantially in the shape of an ogee curve with the ends substantially straight, one end being formed on its upper surface so as to conform substantially to the shape of said supporting bar and the other end being provided with a slot, and a clamping bolt extending through said slot and through said sheet metal for clamping the sheet metal to said slotted end and the clamping bar against said supporting bar, said clamping bolt being provided with a head conforming substantially to the shape of the sheet metal, and a clamping member pressing against the clamping bar.

2. In a fastening for sheet metal, the combination with a supporting bar and a sheet metal covering supported by said bar, of a clamping bar formed with a pair of end portions extending in opposite directions in parallel planes and connected by a diagonal portion, and a clamping bolt provided with a head and clamping one end portion to the metal covering, and the other end portion engaging the opposite face of the supporting bar.

In testimony whereof I have signed my name to this specification in the presence of two subscribing witnesses.

MILLARD A. McCOY.

Witnesses:
JOHN E. BURCH,
PHILIP D. ROLLHAUS.